(12) United States Patent
Jolley

(10) Patent No.: US 7,246,966 B2
(45) Date of Patent: Jul. 24, 2007

(54) BONDED STRUCTURAL JOINTS AND METHOD OF ASSEMBLING SUCH JOINTS

(75) Inventor: Peter Jolley, Warwick (GB)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 10/923,487

(22) Filed: Aug. 20, 2004

(65) Prior Publication Data

US 2005/0081474 A1    Apr. 21, 2005

(30) Foreign Application Priority Data

Aug. 20, 2003 (GB) ................................ 0319491.7

(51) Int. Cl.
*F16B 11/00*    (2006.01)

(52) U.S. Cl. ...................... 403/268; 156/293; 156/295; 403/270; 403/335; 403/353

(58) Field of Classification Search ................ 403/268, 403/270, 353, 335, 336; 156/293, 294, 295
See application file for complete search history.

(56) References Cited

U.S. PATENT DOCUMENTS 958,844 A    5/1910    Vierengel et al.

(Continued)

FOREIGN PATENT DOCUMENTS

DE           3811427 A1    10/1989

(Continued)

OTHER PUBLICATIONS

Mustafa A. Ahmetoglu, Manufacturing of Structural Automotive Components from Extruded Aluminum Profiles, SAE Technical Paper Series, Oct. 3-5, 2000, 2000-01-2712, Detroit, Michigan.

*Primary Examiner*—Daniel P. Stodola
*Assistant Examiner*—Michael P. Ferguson
(74) *Attorney, Agent, or Firm*—Gigette M. Bejin; Dickinson Wright PLLC

(57) ABSTRACT

A joint assembly comprises a hollow extrusion member of an asymmetrical hexagonal section and a flange casting comprising a base flange and several webs including a top web and upper side webs which have joint faces presented to corresponding joint areas on the outside of the extrusion while a bottom web and lower side webs have joint faces which are presented to corresponding joint areas on the inside of the extrusion. To assemble the joint assembly an adhesive is applied to the joint faces and the extrusion aligned with the flange casting but offset vertically. The extrusion is then moved longitudinally towards the flange casting to the full extent permitted by abutment of an extrusion end face with steps to bring the joint faces into overlapping alignment with the corresponding joint areas on the extrusion, there being a substantial clearance due to the vertical offset so that the adhesive on the joint faces does not contact the joint areas on the extrusion at this stage. Then the extrusion is moved transversely relative to the flange casting so that each joint face complete with the adhesive is brought into contact with its corresponding joint area on the extrusion. Holes are then pierced and blind rivets inserted to ensure full contact of the adhesive with the joint areas. The assembly of extrusion and flange casting is then placed in an oven to cure the adhesive.

6 Claims, 6 Drawing Sheets

U.S. PATENT DOCUMENTS

| | | | | |
|---|---|---|---|---|
| 3,561,795 A | * | 2/1971 | Becher | 285/55 |
| 5,609,004 A | | 3/1997 | Kreis | |
| 5,670,108 A | * | 9/1997 | Kern et al. | 156/292 |
| 6,588,970 B1 | * | 7/2003 | Natrop | 403/270 |
| 6,702,507 B2 | * | 3/2004 | Wild | 403/353 |

FOREIGN PATENT DOCUMENTS

| | | |
|---|---|---|
| DE | 4204826 A1 | 12/1991 |
| EP | 0994005 A2 | 10/1998 |
| EP | 1508508 A1 | 2/2005 |
| GB | 2406152 A | 3/2005 |

* cited by examiner

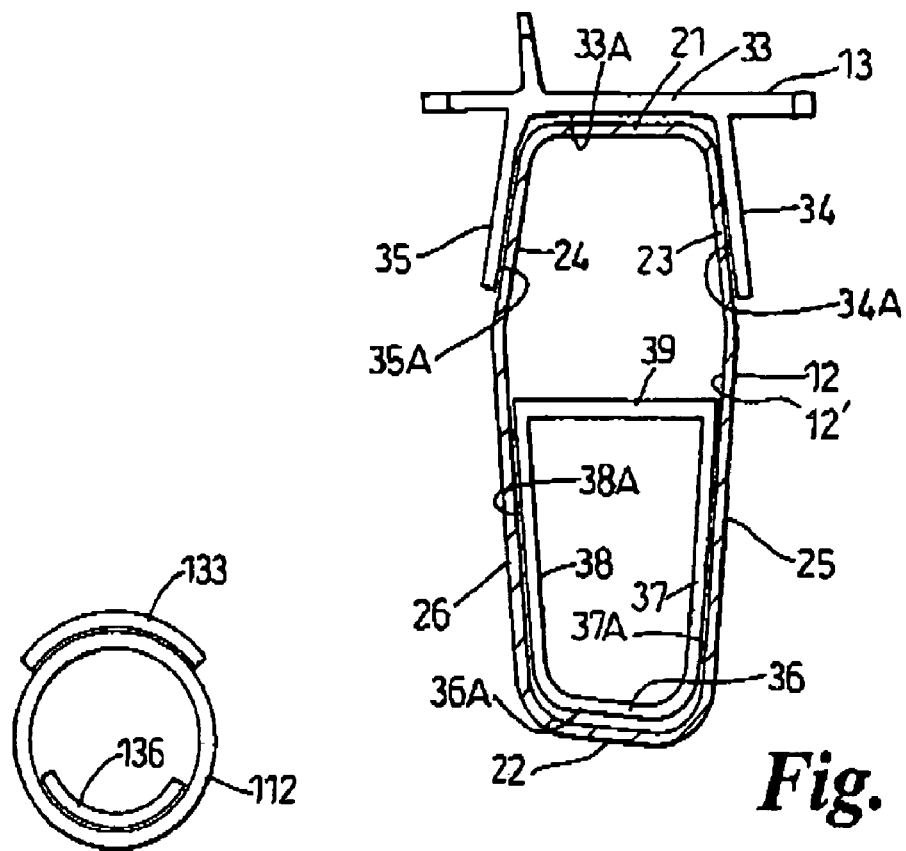
*Fig. 5*
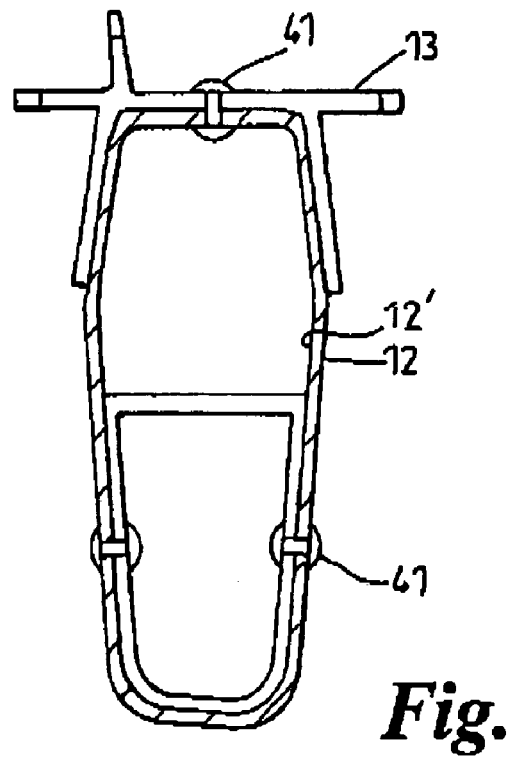
*Fig. 10*
*Fig. 6*

BONDED STRUCTURAL JOINTS AND METHOD OF ASSEMBLING SUCH JOINTS

BACKGROUND OF THE INVENTION

1. Field of the Invention

This invention relates to bonded structural joints, particularly for adhesively joining two structural members.

2. Disclosure Information

Typically, when using an adhesive such as an epoxy resin, the adhesive is applied to a joint face of one or both members and these are brought together and fixed while the adhesive cures. However, when a hollow section is being joined, e.g. to an end flange, it is common to form the end flange with a complementary section such as a plug or a socket. The plug or socket has to be dimensioned to fit the inside or the outside of the hollow section with a clearance which will be filled with adhesive. This clearance has to be small in order to give adequate bond strength in the cured adhesive but this gives a problem with assembling the joint because the uncured adhesive tends to be wiped off the joint surface as the components are brought together.

An object of the present invention is to provide joint assembly which avoids the above problem.

SUMMARY OF THE INVENTION

According to one aspect of the invention there is provided a joint assembly for adhesively joining two structural members, the first structural member being in the form of an elongate hollow section and the second structural member having longitudinally extending webs presenting joint faces coated with an adhesive, the joint faces in use overlying and being adhesively bonded to corresponding joint areas of the first member, wherein at least one of the joint areas is on the outside of the hollow section and at least one other of the joint areas is on the inside of the hollow section, the webs being arranged so that before bonding the first structural member can be moved longitudinally relative to the second structural member to bring the joint areas and the joint faces into overlapping alignment with a substantial clearance therebetween and then moved transversely relative to the second structural member to bring the joint faces into adhesive contact with the joint areas.

The invention also provides, according to another aspect, a method of making a joint assembly of two structural members, the first structural member being in the form of an elongate hollow section and the second structural member having longitudinally extending webs presenting joint faces which in use overlie and are adhesively bonded to corresponding joint areas of the first member, wherein at least one of the joint areas is on the outside of the hollow section and at least one other of the joint areas is on the inside of the hollow section, the method comprising the steps of applying an adhesive to the joint faces, moving the first structural member longitudinally relative to the second structural member to bring the joint areas and the joint faces into overlapping alignment with a substantial clearance therebetween, moving the first structural member transversely relative to the second structural member to bring the joint faces into adhesive contact with the joint areas and curing the adhesive.

In accordance with either aspect of the invention, there is preferably a first said web or arrangement of said webs having joint faces or bonding to the inside of the section and a second said web or arrangement of said webs having joint faces for bonding to the outside of the section. Conveniently, the first web or arrangement of webs forms a saddle and the second web or arrangement of webs forms a trough. In such a case, the hollow section is preferably hexagonal in cross-section, the saddle being formed by a bottom web and two inclined lower side webs and the trough being formed by a top web and two inclined upper side webs. A lateral web may extend between the upper ends of the two inclined lower side webs so that the lateral web, die lower side webs and the bottom web form a box section.

Preferably, the hollow section has a continuous end face extending substantially perpendicular to a longitudinal axis of said section, the end face abutting the second structural member. Conveniently, gaps are formed between the first said web or arrangement of said webs and the second said web or arrangement of said webs such that the hollow section extends into the gaps.

These and other objects, features, and advantages of the present invention will become apparent from a reading of the following detailed description with reference to the accompanying drawings, in which:

BRIEF DESCRIPTION OF THE DRAWINGS

FIG. 5 is a cross section on the line V-V in FIG. 3;

FIG. 6 is a view based on FIG. 5 showing the components in the assembled condition;

FIG. 10 is a diagrammatic cross section based on FIG. 5 showing a different section of extruded member.

DETAILED DESCRIPTION

Figure 1:
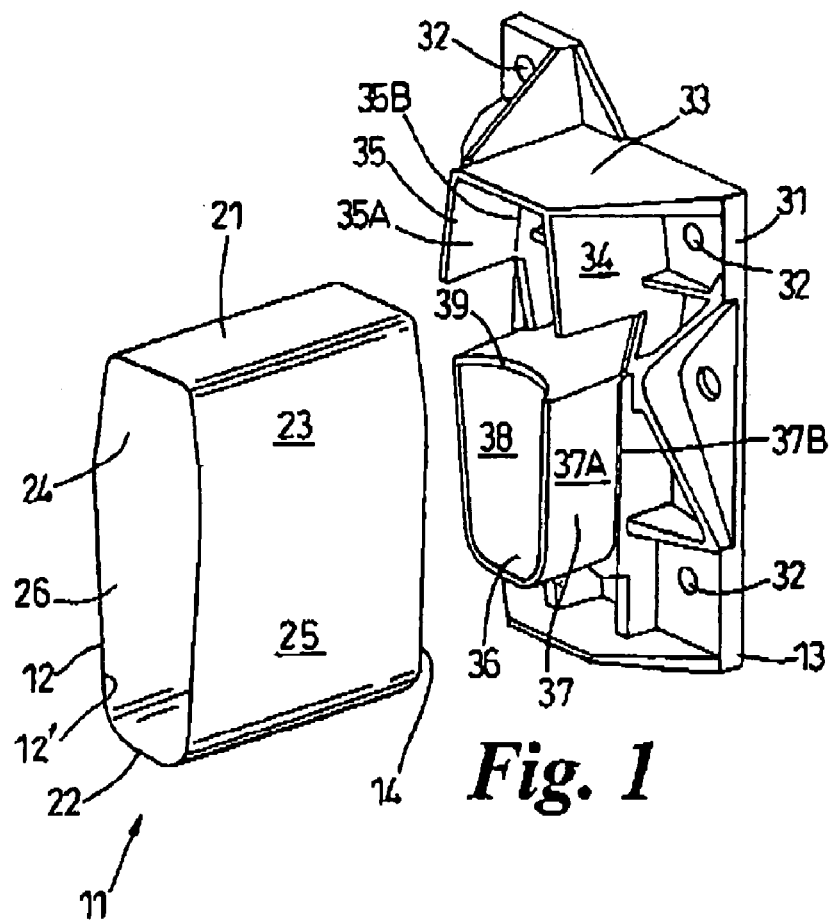
FIG. 1 is a perspective view of a hollow extruded member and an end flange member prior to forming a joint assembly according to the invention.
Figure 2:
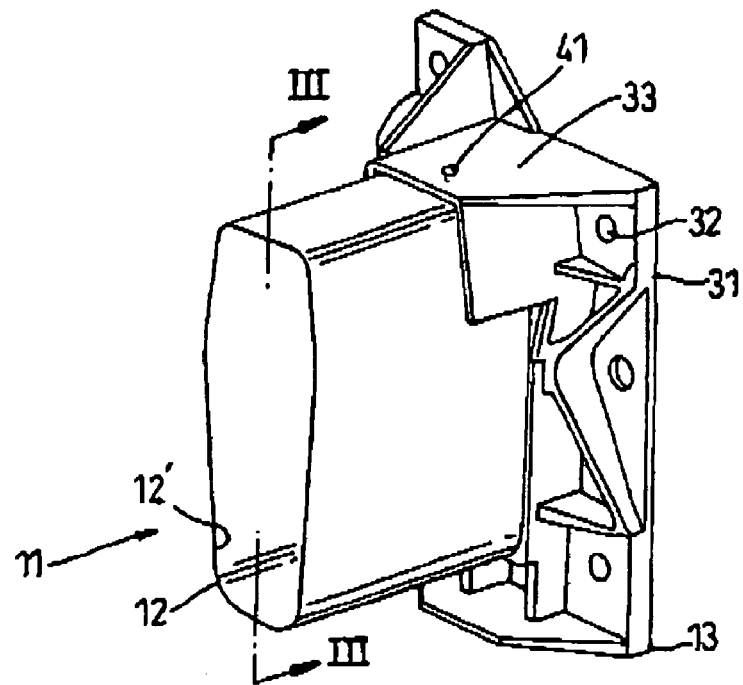
FIG. 2 is a perspective view of the components shown in FIG. 1 in an assembled condition.

Referring to FIGS. 1 to 6, joint assembly 11 comprises a hollow extruded member 12 of an asymmetrical hexagonal section and a flange member 13. The extruded member 12, more conveniently referred to as the extrusion, is of constant section throughout and has a continuous end face 14 extending substantially perpendicular to its longitudinal axis. The section of the extrusion 12 has a central bore 12' formed of six wall portions; a top wall portion 21, a bottom wall portion 22, upper side portions 23, 24 and lower side portions 25, 26. As shown in FIGS. 1 through 6, the top wall 21 is positioned diametrically across the central bore 12' from the bottom wall 22. The flange member 13 is formed as a casting and is thus more conveniently referred to as the flange casting. It comprises a base flange 31 which extends perpendicularly to the extrusion 12 and is provided with attachment holes 32 and several webs which extend perpendicularly from the base flange 31 towards the extrusion 12. Of these webs, a top web 33 and inclined upper side webs 34, 35 have joint faces 33A, 34A, 35A which are presented to corresponding joint areas on the outside of the top wall portion 21 and the upper side wall portions 23, 24 of the extrusion 12 while a bottom web 36 and inclined lower side webs 37, 38 have joint faces 36A, 37A, 38A which are presented to corresponding joint areas on the inside of the bottom wall portion 22 and the lower side wall portions 25, 26 of the extrusion. Gaps are formed between the upper arrangement of webs 33, 34, 35 and the lower arrangement of webs 36, 37, 38 such that the extrusion 12 can extend into the gaps during assembly as will be described later.

Other webs on the flange casting 13 are provided for strength and stiffening, notably a lateral web 39 which extends between the upper ends of the lower side webs 37, 38 so that the lateral web 39, the lower side webs 37, 38 and the bottom web 36 form a box section. All of the webs are tapered, i.e. have draft angles as is consistent with good casting design. However, the joint faces 33A, 34A, 35A 36A, 37A, 38A extend parallel to the corresponding joint areas of the extrusions, each joint face extending only part way towards the base flange 31 and forming a respective step 33B, 34B, 35B, 36B, 37B, 38B where it adjoins the tapered part of the web 33, 34, 35, 36, 37, 38.

Figure 3:
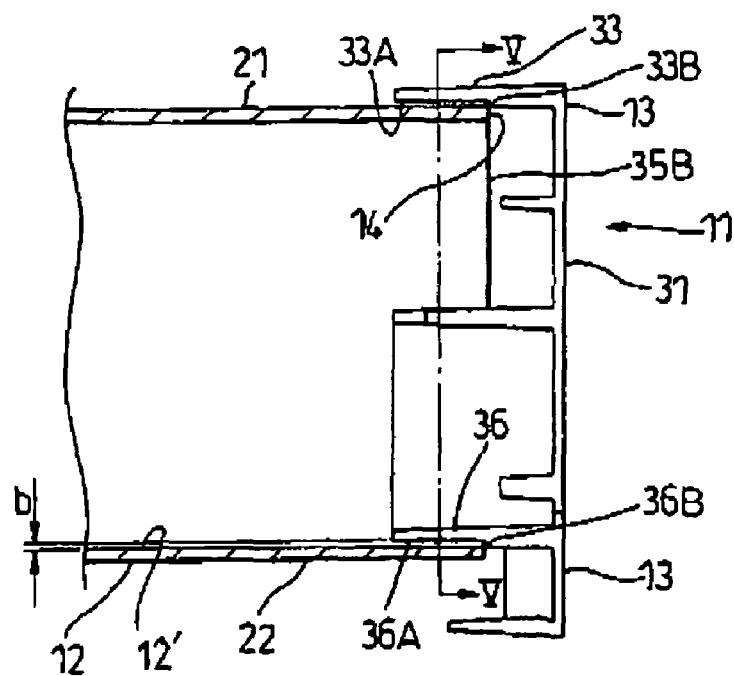
FIG. 3 is a cross section on the plane III-III in FIG. 2 with components in an intermediate position just prior to the assembled condition.
Figure 4:
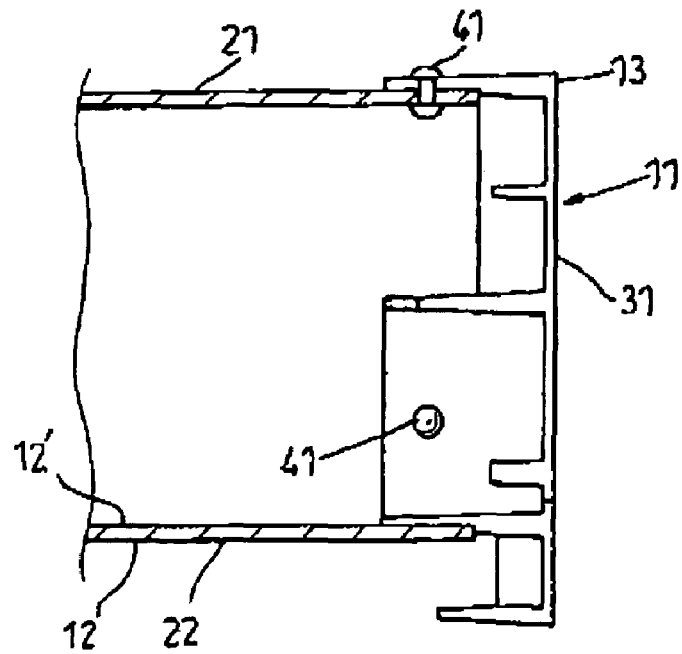
FIG. 4 is a view based on FIG. 3 but showing the components in the assembled condition.

To assemble the joint assembly 11, an adhesive is applied to the joint faces 33A, 34A, 35A, 36A, 37A, 38A. The extrusion 12 is then aligned with the flange casting 13 but offset vertically as seen in FIGS. 1, 3 and 5 so that the flange casting 13 is higher than the extrusion. The extrusion 12 is then moved longitudinally towards the flange casting 13 to the full extent permitted by abutment of the extrusion end face 14 with the steps 33B, 34B, 35B, 36B, 37B, 38B to bring the joint faces 33A, 34A, 35A, 36A, 37A, 38A into overlapping alignment with the corresponding joint areas on the extrusion 12, there being a substantial clearance (FIG. 3) due to the vertical offset so that the adhesive on the joint faces does not contact the joint areas on the extrusion at this stage. Then the extrusion 12 is moved transversely relative to the flange casting 13, i.e. upwards as seen in FIGS. 1, 3 and 5, so that each joint face 33A, 34A, 35A, 36A, 37A, 38A complete with the adhesive is brought into contact with its corresponding joint area on the extrusion 12. Holes are then drilled or pierced and blind rivets 41, e.g. as sold under the trade mark MONOBOLT, are then inserted, the self-tightening action of the rivets helping to ensure full contact of the adhesive with the joint areas. The assembly of extrusion 12 and flange casting 13 is then placed in an oven to cure the adhesive. A suitable adhesive is Dow (trade mark) BETAMATE XD4600 (trade mark) while the extrusion 12 and the flange casting 13 may be anodised aluminium alloy.

Figure 7:
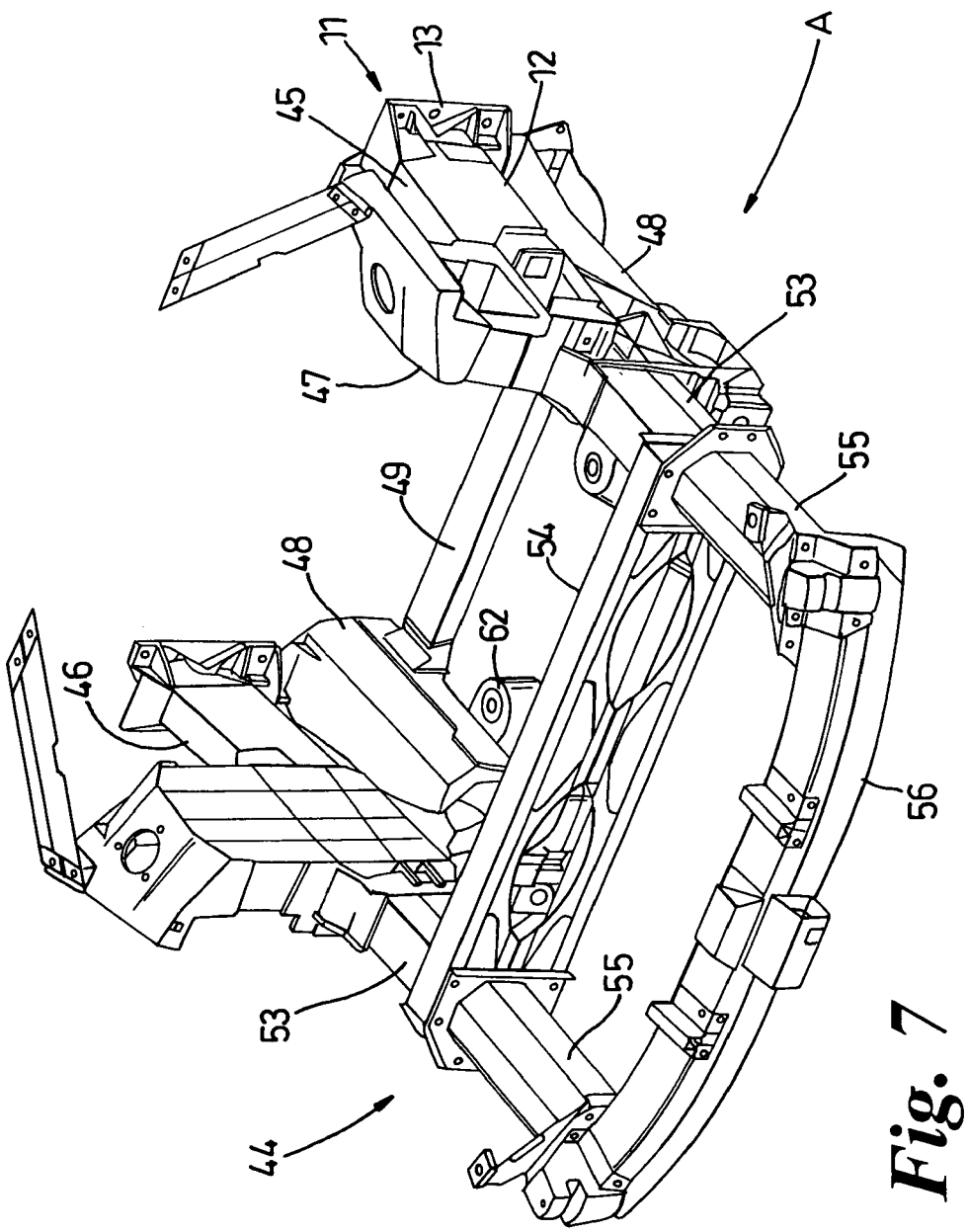
FIG. 7 is a perspective view showing the components incorporated in a front subframe assembly of a motor vehicle.
Figure 8:
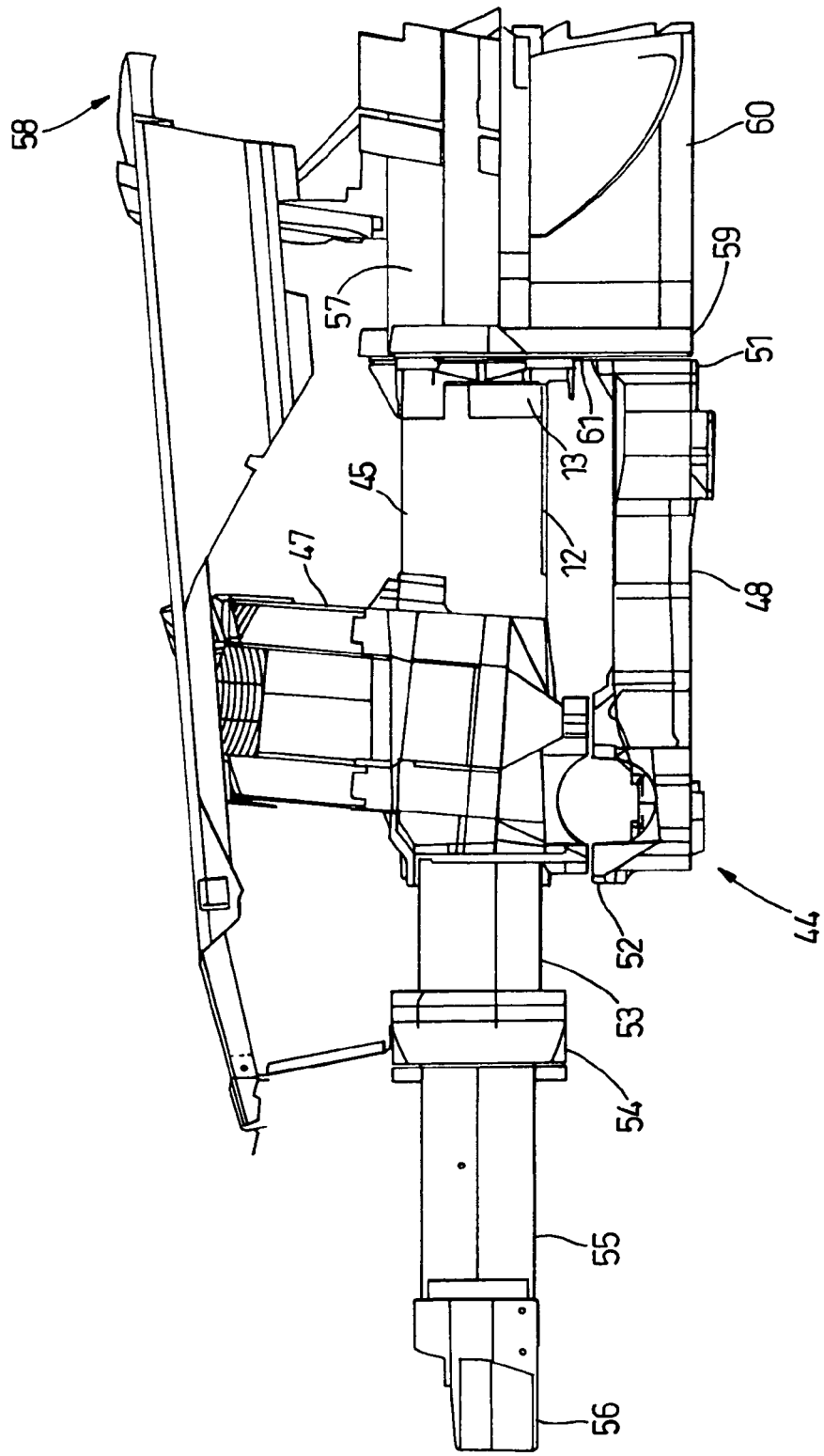
FIG. 8 is a view on arrow A in FIG. 7 and also showing part of a vehicle body.
Figure 9:
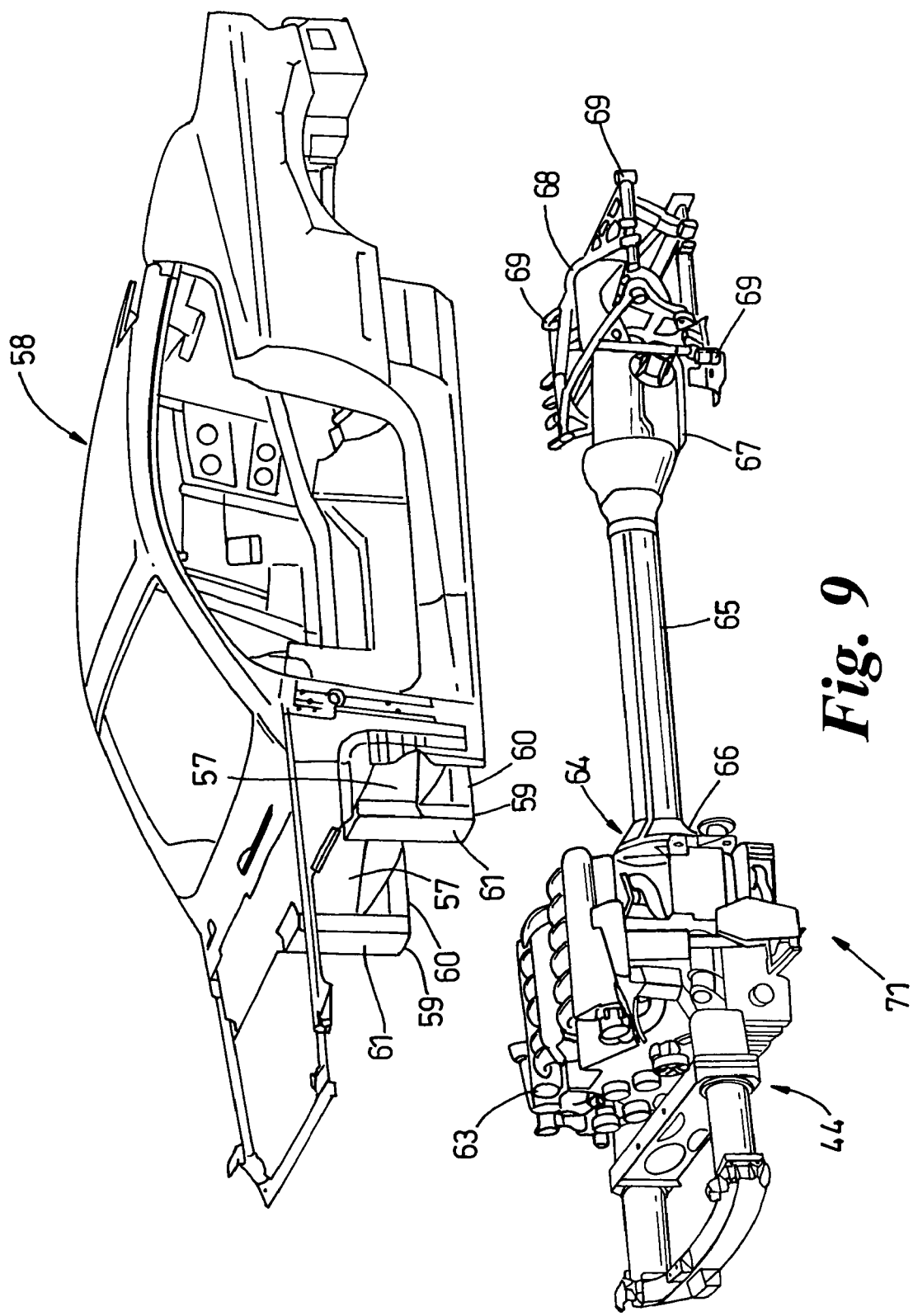
FIG. 9 is a perspective view of the subframe assembly shown in FIGS. 7 and 8 attached to a power train assembly and a rear subframe to form a power train and chassis module and a vehicle body aligned for assembly to the power train and chassis module.

FIGS. 7 to 9 show the assembled extrusion 12 and flange casting 13 in use in a front subframe assembly 44 of a motor vehicle, the extrusion and casting being part of a first main longitudinal beam 45. At the other end of the extrusion 12 to the flange casting 13 there is a cast suspension tower 47 which is joined to the extrusion in the same manner and at the same time as the flange casting 13. A second main longitudinal beam 46 is a mirror image of the first beam 45. A pair of lower longitudinal beams 48, formed as castings, extend parallel to the main longitudinal beams 45, 46 and are connected by a welded cross member 49. Each lower longitudinal beam 45, 46 has a vertical rear flange 51 and a generally horizontal front flange 52 where it is attached to a corresponding flange face at the lower end of each suspension tower 47.

Extending forward of the suspension towers 47 are two intermediate longitudinal beams 53, each having a rear vertical flange for attachment to the corresponding suspension tower 47 and a front vertical flange attached to a main cross-member 54. Forward of the main cross member 54 and flange mounted to it are two front longitudinal beams or crush cans 55 to which is attached a front cross member or bumper armature 56.

The front subframe assembly 44 is for attachment to a vehicle body 58, the body having a passenger compartment and carrying two vertical pillars 59. The pillars 59 are each supported just forward of the passenger compartment by a respective pair of triangulated supports 57 and a respective lower longitudinal member 60. The pillars 59 each have a forward-facing attachment face 61 to receive the main longitudinal beams 45 at the flange castings 13 and the lower longitudinal beams 45 at the rear flange 51. The lower longitudinal beams 45 have mounting holes 62 for engine mountings to support an engine 63 which forms part of a powertrain assembly 64 which also includes a torque tube 65 attached to the rear of the engine by a bell housing 66 and a rear transmission and final drive assembly or transaxle 67. The transaxle has a tubular rear subframe 68 attached to it and this has mounting points 69 for the rear of the body 58. The powertrain assembly 64 with the front and rear subframes 44, 68 thus forms a power train and chassis module 71.

The body 58 is assembled to the power train and chassis module 71 by lowering the body with the front face 61 of the vertical pillars 59 just rearward (e.g. by 10 mm) of the rear faces of the flanges 13 and 51 until the various fixing holes in the flanges align with those in the pillars. The body 58 is then moved forward to close the gap between the flanges and the pillars 59 and suitable bolts or set screws inserted.

The weight of the body 58 is supported at its front end by the joint assembly 11 such that a compressive load is taken through the webs of the flange casting 13 onto the extrusion 12, thereby avoiding tensile loading. The rivets 41 are essentially for assembly purposes only, i.e. during curing of the adhesive. In the extreme loading case of a front-end collision the extrusion 12 is put under an extreme compression load. Nevertheless, the joint assembly 11 is able to support such loads because these are reacted directly by the abutment of the extrusion end face 14 with the steps in the webs.

While the extrusion 12 is of constant section throughout, this is not essential for the joint assembly 11 except in the region where the extrusion joins the flange member 13. For example, other regions could be deformed locally or more generally, e.g. by hydroforming. Also, joint assemblies of this same type could be made using hollow sections made by other methods, e.g., drawn sections or fabricated sections. Also, other sections of extrusion and corresponding arrangements of webs could be used in such joint assemblies as is illustrated diagrammatically in FIG. 10 where a round hollow section 112 is joined to a member having a curved web 136 inserted inside the section and a curved web 133 fitting outside the section. It can be seen that the lower, inner, web 136 forms an inverted saddle, in much the same way as the webs 36, 37 and 38 also form an inverted saddle while the upper, outside, web 133 forms an inverted trough, in much the same way as the webs 36, 37 and 38 also form an inverted trough.

What is claimed is:

1. A joint assembly for adhesively joining two structural members, a first structural member being in the form of an elongate hollow section, said section being hexagonal in cross-section and having a continuous end face extending substantially perpendicular to a longitudinal axis of said section, and a second structural member having longitudinally extending webs presenting joint faces coated with an adhesive, the joint faces in use overlying and being adhesively bonded to corresponding joint areas of the first member with the end face abutting the second structural member, wherein at least one of the joint areas is on the outside of the hollow section and at least one other of the joint areas is on the inside of the hollow section, the webs being arranged so that before bonding the first structural member can be moved longitudinally relative to the second structural member to bring the joint areas and the joint faces into overlapping alignment with a substantial clearance therebetween and then moved transversely relative to the second structural member to bring the joint faces into adhesive contact with the joint areas, there being a first arrangement of said webs having joint faces for bonding to the inside of the section and a second arrangement of said webs having joint faces for bonding to the outside of the section, the first arrangement of webs forming a saddle and the second arrangement of webs forming a trough, the saddle being formed by a bottom web and two inclined lower side webs and the trough being formed by a top web and two inclined upper side webs, gaps being formed between the first arrangement of said webs and the second arrangement of said webs such that the hollow section extends into the gaps.

2. A joint assembly for adhesively joining two structural members, the joint assembly comprising:
a first structural member in the form of an elongate hollow section defining a longitudinal direction and having joint areas thereon;
a second structural member formed as a casting and having longitudinally extending webs and presenting joint faces coated with an adhesive, each joint face in use overlying and being adhesively bonded to a corresponding one of the joint areas of the first member, a first said web or arrangement of said webs forming a saddle where the joint faces are arranged for bonding to the joint areas on the inside of the section and a second web or arrangement of said webs forming a trough where the joint faces are arranged for bonding to the joint areas on the outside of the section, there being gaps between the first said web or arrangement of said webs and the second said web or arrangement of said webs so that before bonding the first structural member can be moved in the longitudinal direction relative to the second structural member to bring the joint areas and the joint surfaces into overlapping alignment with a clearance therebetween so that the adhesive on the joint faces does not contact the joint areas and so that the first structural member can then be moved transversely relative to the second structural member to bring the joint faces into adhesive contact with the joint areas.

3. The joint assembly of claim 2 wherein the hollow section is hexagonal in cross-section, the saddle being formed by a bottom web and two inclined lower side webs and the trough being formed by a top web and two inclined upper side webs.

4. The joint assembly of claim 3 wherein a lateral web extends between the upper ends of the two inclined lower aide webs so that the lateral web, the lower side webs and the bottom web form a box section.

5. The joint assembly of claim 2 wherein the hollow section has a continuous end face extending substantially perpendicular to a longitudinal axis of said hollow section, the end face abutting the second structural member.

6. The joint assembly of claim 2 wherein said elongate hollow section is formed from an extrusion process.

* * * * *